July 4, 1950            I. S. RITTER            2,513,679

AIR CONDITIONING SYSTEM FOR PASSENGER VEHICLES

Filed June 4, 1947            6 Sheets-Sheet 1

INVENTOR.
IRVING S. RITTER
BY Robert J. Palmer
Attorney

July 4, 1950     I. S. RITTER     2,513,679
AIR CONDITIONING SYSTEM FOR PASSENGER VEHICLES
Filed June 4, 1947     6 Sheets-Sheet 3

INVENTOR.
IRVING S. RITTER
BY Robert T. Palme
Attorney

July 4, 1950 I. S. RITTER 2,513,679
AIR CONDITIONING SYSTEM FOR PASSENGER VEHICLES
Filed June 4, 1947 6 Sheets-Sheet 4

INVENTOR.
IRVING S. RITTER
BY Robert J. Palmer
Attorney

July 4, 1950 — I. S. RITTER — 2,513,679
AIR CONDITIONING SYSTEM FOR PASSENGER VEHICLES
Filed June 4, 1947 — 6 Sheets-Sheet 5

INVENTOR.
IRVING S. RITTER
BY Robert T. Palmer
Attorney

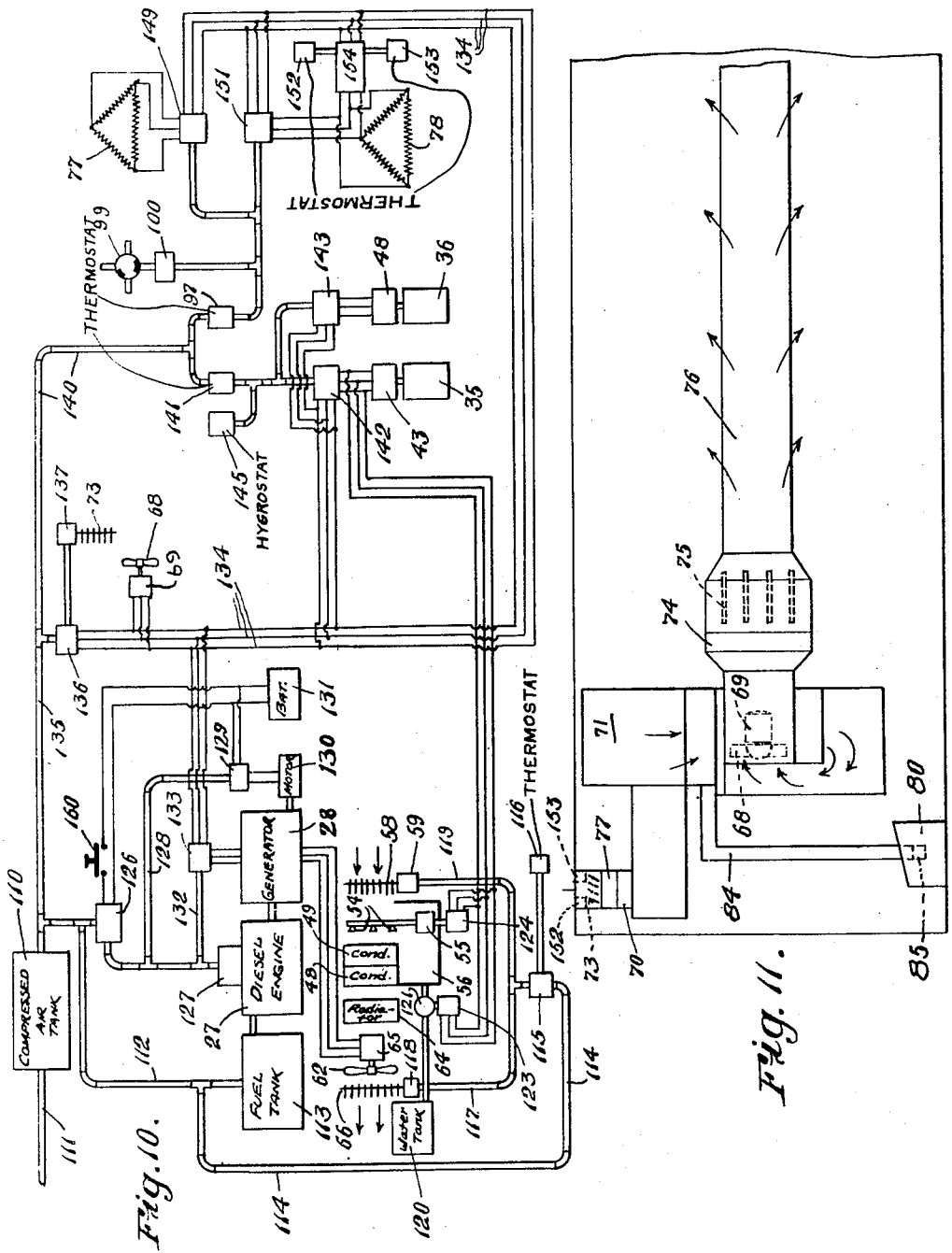

Patented July 4, 1950

2,513,679

UNITED STATES PATENT OFFICE 2,513,679

AIR CONDITIONING SYSTEM FOR PASSENGER VEHICLES

Irving S. Ritter, Sharon, Mass., assignor to Westinghouse Electric Corporation, East Pittsburgh, Pa., a corporation of Pennsylvania Application June 4, 1947, Serial No. 752,339

10 Claims. (Cl. 62—6)

This invention relates to air conditioning systems and apparatus for passenger vehicles such as railway passenger cars.

The conventional, air conditioning system for a railway passenger car, utilizes a single refrigerant compressor having sufficient capacity to handle peak loads; uses an axle driven, electric generator on the car, for energizing the electric motor driving the refrigerant compressor and the other electric equipment on the car, and uses steam from the locomotive for heat in winter.

The power for operating the axle generator is taken from the locomotive of a train, and in many cases, due to the load of the lights and many electric auxiliaries on a car, in addition to the load of the air conditioning equipment, amounts to as much as thirty-six horsepower per car. On long trains this requires an excessive amount of power from the locomotives.

Another disadvantage of the conventional, air conditioning system for a railway passenger car using but a single, large refrigerant compressor is that since most of the time the compressor is in operation, its load is far below its design capacity, the power it consumes is out of proportion to the load due to oversized components. Still another disadvantage of such a system is that in the case of failure of the one compressor, it is impossible to operate the air conditioning system to cool the car.

A disadvantage of the conventional heating apparatus used in an air conditioned, railway passenger car, is that it uses steam from the locomotive, reducing as in the case of axle driven generators, the power available for drawing the train.

This invention provides for an air conditioned, passenger vehicle, an internal combustion engine such as a Diesel engine, driving an alternating current generator which energizes the electric motors driving two refrigerant compressors, and which energizes the other electric equipment of the air conditioning system, the electric auxiliaries on the car, and the car lights.

A feature of this invention is that the Diesel engine and the generator it drives are mounted on one set of slide rails, and the air cooling evaporators, and refrigerant compressors and their condensers are mounted on another set of slide rails, which arrangement permits easy removal and replacement of such equipment through a hinged door in a side of the car when servicing or renewal is required.

Another feature of the invention is that outdoor air is used to cool the refrigerant condensers, which after passing over the condenser surfaces, is passed over the refrigerant compressors, then through the engine radiator, and then over the surfaces of the engine and the generator, following which it is exhausted to the tracks.

Another feature of the invention is that the the chilled air exhausted from the passenger space for replacement by fresh, make-up air, is circulated through the electric generator for cooling same, and is then supplied into the intake manifold of the engine as combustion air. Such air is clean and warm and its use for combustion eliminates the need for the usual air filters.

Other features of the invention reside in the provision of automatic controls which ensure high operating efficiency, and trouble free operation.

An object of the invention is to improve the performance of air conditioning systems for passenger vehicles.

Another object of the invention is to facilitate the installation of air conditioning apparatus in, and the removal of such apparatus from passenger vehicles.

The invention will now be described with reference to the drawing of which:

Fig. 10 is a diagrammatic view illustrating the controls for the complete system, and Fig. 11 is a diagrammatic plan view looking downwardly upon the air passages of the system.

Figure 1:
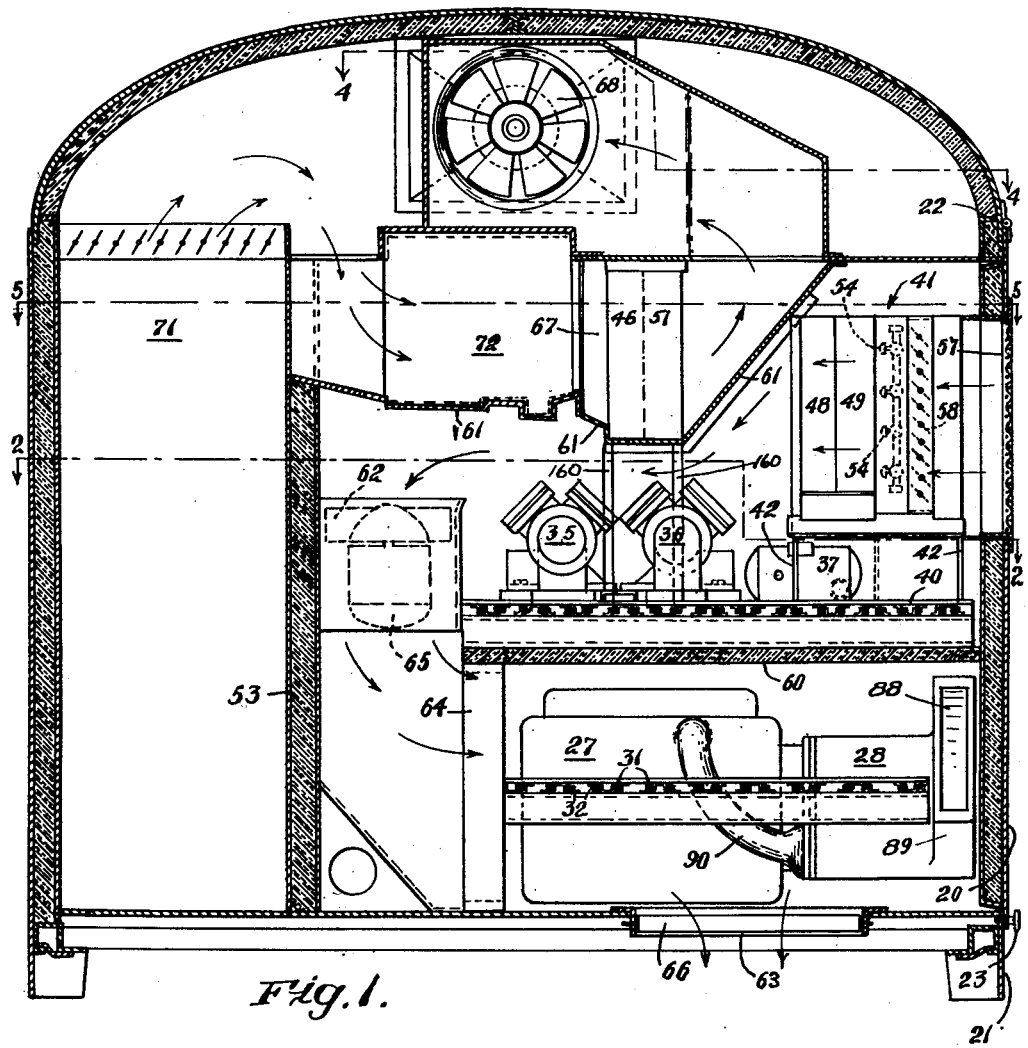
Fig. 1 is a view in cross-section, of a railway passenger car containing an air conditioning system embodying this invention.
Figure 6:
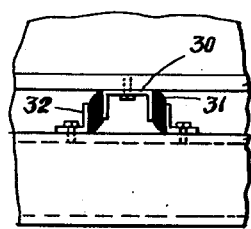
Fig. 6 is an enlarged view illustrating one of the resilient supports used for supporting the refrigerant compressor and condenser units, and the Diesel engine and generator units, on their slide rails.
Figure 7:
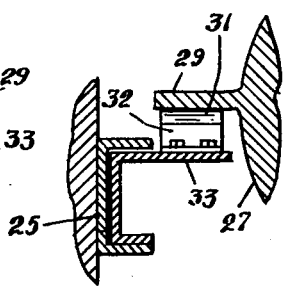
Fig. 7 is an end elevation in section, of the apparatus shown by Fig. 6.

Referring first to Figs. 1, 3, 6 and 7, the physical arrangements of the engine-generator unit and of the refrigerant compressor units on their supports in the car, will be described. The car has a door 20 in one of its side walls 21, and which is hinged at 22 to the upper portion of the wall 21. The lower portion of the door normally is fastened to the wall 21 by the bolts 23, the arrangement being that when it is desired to install or remove the engine-generator or the compressor units, the bolts 23 are loosened, and the door 20 is swung outwardly and held in that position.

The pairs of U-shaped rails 25 and 26 are permanently installed in the car parallel to its floor, with their outer ends adjacent the door 20. The lower rails 26 support the Diesel engine 27 and the electric generator 28 connected thereto. The engine and generator have the outwardly extending flanges 29 which are bolted to the inverted U-shaped members 30 which have vulcanized thereto the inner sides of the rubber members 31, the outer sides of which are vulcanized to the supports 32. The supports 32 are bolted to the L-shaped rails 33 which fit slidably in the rails 26.

The rubber members 31 absorb vibrations of the car and prevent the transmission thereof to the engine-generator unit.

The engine-generator unit can be easily withdrawn or installed through the open door 20 through the slidable support provided by the rails 26 and 33.

The two refrigerant compressors 35 and 36 with their receivers 37 and 38, the evaporator coils 46 and 47, the duct wall 61, and the evaporative condenser unit 41, are mounted on the support 40 which corresponds to the flange 29 described in connection with the engine-generator supports in the foregoing. The evaporator coils and the duct wall 61 are supported upon the uprights 160 the lower ends of which are welded to the support 40. The evaporative condenser unit is supported upon the uprights 42, the lower ends of which are welded to the support 40. The support 40 is resiliently supported on the rails 39 similar to the rails 33, and which fit slidably in the rails 25.

With the door 20 open, the evaporators, the duct wall 61 supported therewith, the compressors, their receivers, and the evaporative condenser unit can be removed from or installed in the car, as a unit, through the slidable supports provided by the rails 39 within the rails 25.

The duct wall 61 forms, with the lower wall 161 of the electrostatic precipitator 72, a dividing wall between the air passage into the fan 68, and the air passage with the fan 62.

Figure 8:
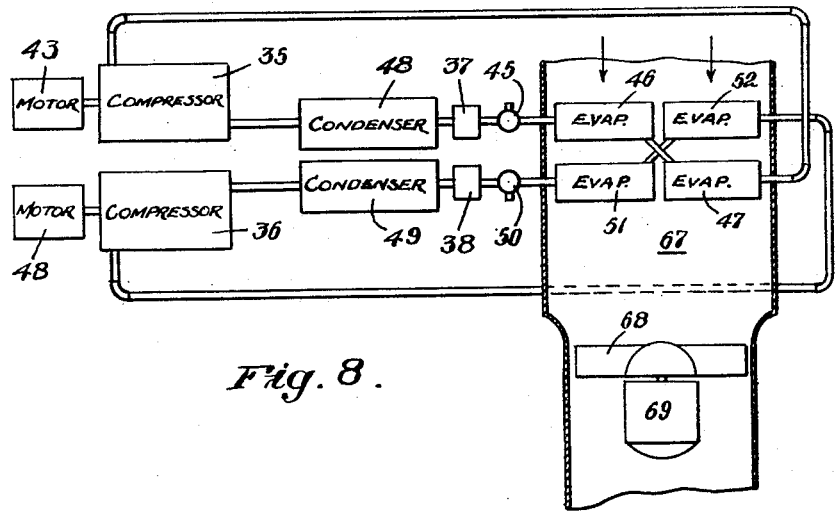
Fig. 8 is a diagrammatic view illustrating the refrigeration systems including the compressors, the condensers, the expansion valves, and the evaporators, the latter being illustrated in an air conditioning compartment upstream of a motor driven fan.

With reference to Fig 8, the refrigerant compressor 35 is driven by the electric motor 43, and has its high pressure side connected through the condenser coil 48, the receiver 37 and the expansion valve 45 to the evaporator coil 46 and 47 in series, and which discharge vapor into the suction side of the compressor 35.

The compressor 36 is driven by the electric motor 48 and has its high pressure side connected through the condenser coil 49, the receiver 38 and the expansion valve 50 to the two evaporators 51 and 52 in series, and which discharge vapor into the suction side of the compressor 36.

The electric motors driving the compressors may be sealed within the compressors, or may be external motors.

Figure 5:
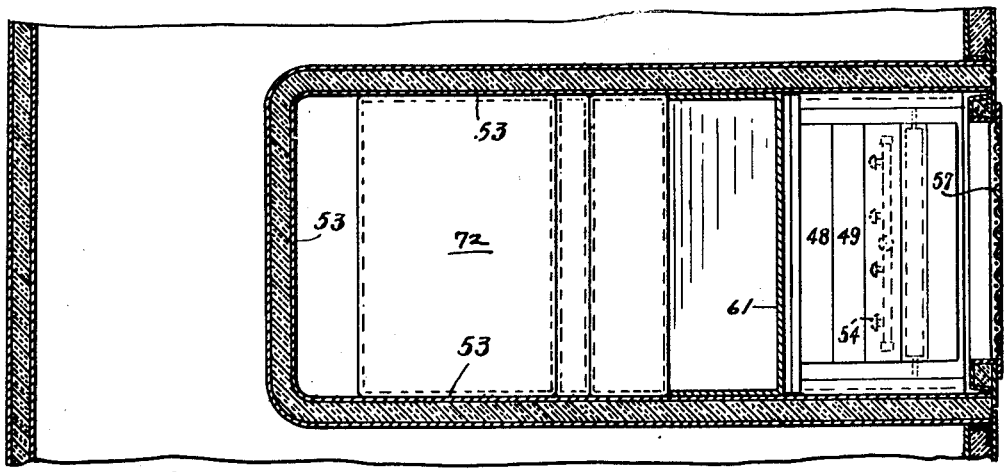
Fig. 5 is a sectional view along the lines 5—5 of Fig. 1.

The condenser coils 48 and 49 are built into the evaporative condenser unit 41 in the path of water sprayed by the nozzles 54, and which is supplied thereto by the pump 55 in the sump 56 of the unit. (Fig. 10). The air inlet to the unit 41 is in the door 20, and has the screen 57 (Fig. 5) thereacross for preventing the entry thereinto of insects and other foreign particles. The damper louvres 58 are between the screen 57 and the nozzles 54, and are adapted to be opened and closed by the motor 59 as will be described in connection with Fig. 10

The wall 60 of insulating material extends horizontally between the supporting rails 25 and the engine 27 and the generator 28, and forms with the vertical walls 53 (Fig. 5) and the duct wall 61, an air passage which connects the outlet of the condenser unit 41 with the inlet of the fan 62. The outlet of the fan 62 discharges into an air passage defined by the walls 53 and 60 and the floor of the car under the engine-generator unit. The floor has the outlet 63 therein which discharges onto the railway track. The engine radiator 64 is located between the wall 60 and the car floor adjacent the fan 62. The outlet 63 contains the louvres 66 adapted to be adjusted by the motor 118 as will be described.

In operation, the fan 62 driven by the electric motor 65, draws outdoor air through the screen 57, through the damper louvres 58, through the spray from the nozzles 54, through the condenser coils 48 and 49, and blows this air through the radiator 64, over the surfaces of the engine 27 and the generator 28, and through the outlet 63, thus cooling the radiator and the outer surfaces of the engine-generator unit as well as the condenser coils 48 and 49.

The evaporator coil 46 of the compressor 35 as illustrated by Fig. 8, is upstream with respect to air flow, of the corresponding evaporator coil 51 of the compressor 36, and the evaporator coil 47 of the compressor 35 is downstream of the corresponding evaporator coil 52 of the compressor 36. Thus the evaporator coils of each compressor extend completely across the air stream passing through the air cooling compartment 67, and have the same exposure to the air being cooled whereby each set of evaporator coils is equally effective in cooling and dehumidifying the air stream.

It is preferred that the capacity of each compressor be sufficient to take care of the average load with both compressors being cut in as will be described in connection with Fig. 10, for taking care of peak loads.

The air to be cooled in summer, and heated in winter, is drawn by the fan 68 driven by the electric motor 69, through the outdoor air inlet passage 70 (Fig. 11) and through the recirculated air inlet passage 71. The mixed outdoor and recirculated air then is drawn through the electrostatic, air cleaner 72 which may be generally similar to that disclosed in the G. W. Penney Patent No. 2,129,783, and is then drawn through evaporator coils 46, 47, 51 and 52 and into the inlet of the fan 68. The conditioned air is blown by the fan 68 through the hot water, heating coil 74 (Fig. 11) and over the ultraviolet sterilizer lamps 75 and thence into the air distributing duct 76 which extends over the passenger space in the car, and which has a plurality of spaced outlets through which the conditioned air is discharged.

The outdoor air passage 70 has mounted therein the electric heater 77 for heating the outdoor air when this is desired. The passenger space of the car has the floor heaters 78 which replace the usual steam, floor heaters. The heaters 77 and 78 are automatically controlled by the thermostats 152 and 153 in the passage 70, as will be described in connection with Fig. 10.

Figure 2:
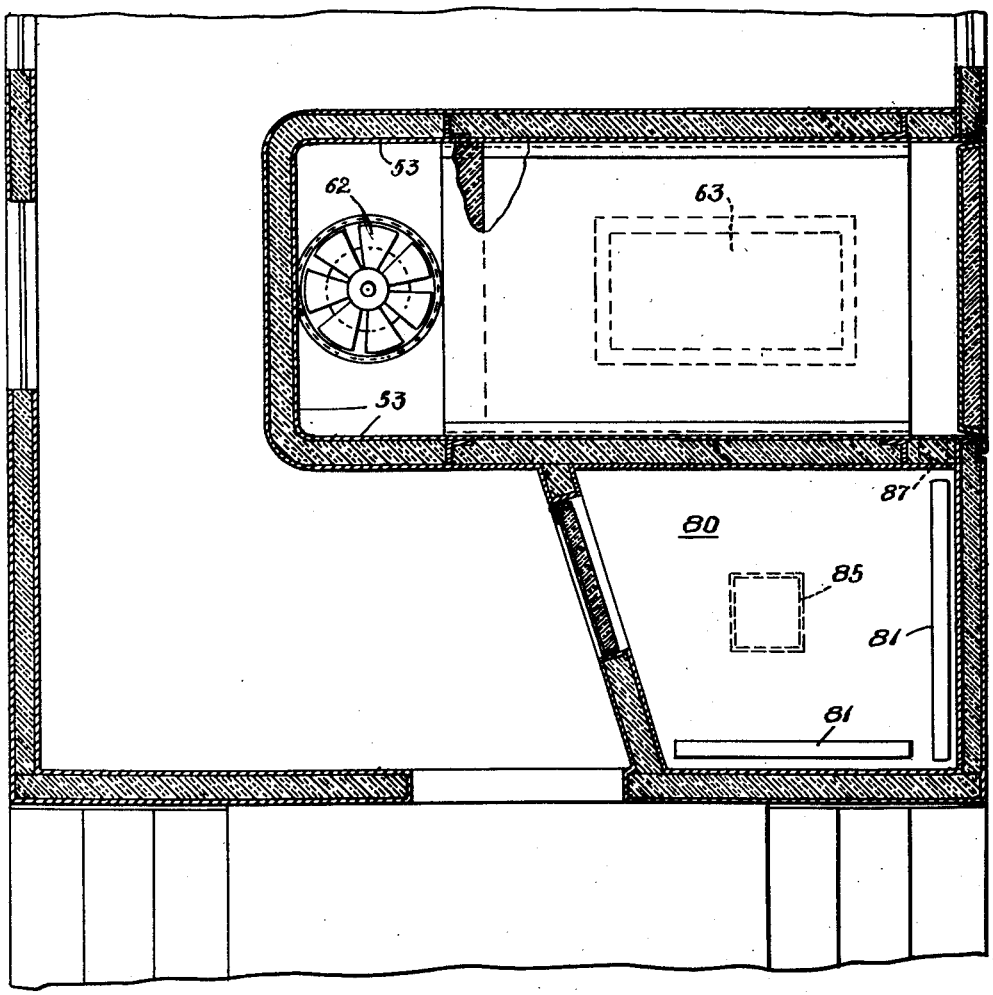
Fig. 2 is a sectional view, with parts removed, along the lines 2—2 of Fig. 1.
Figure 3:
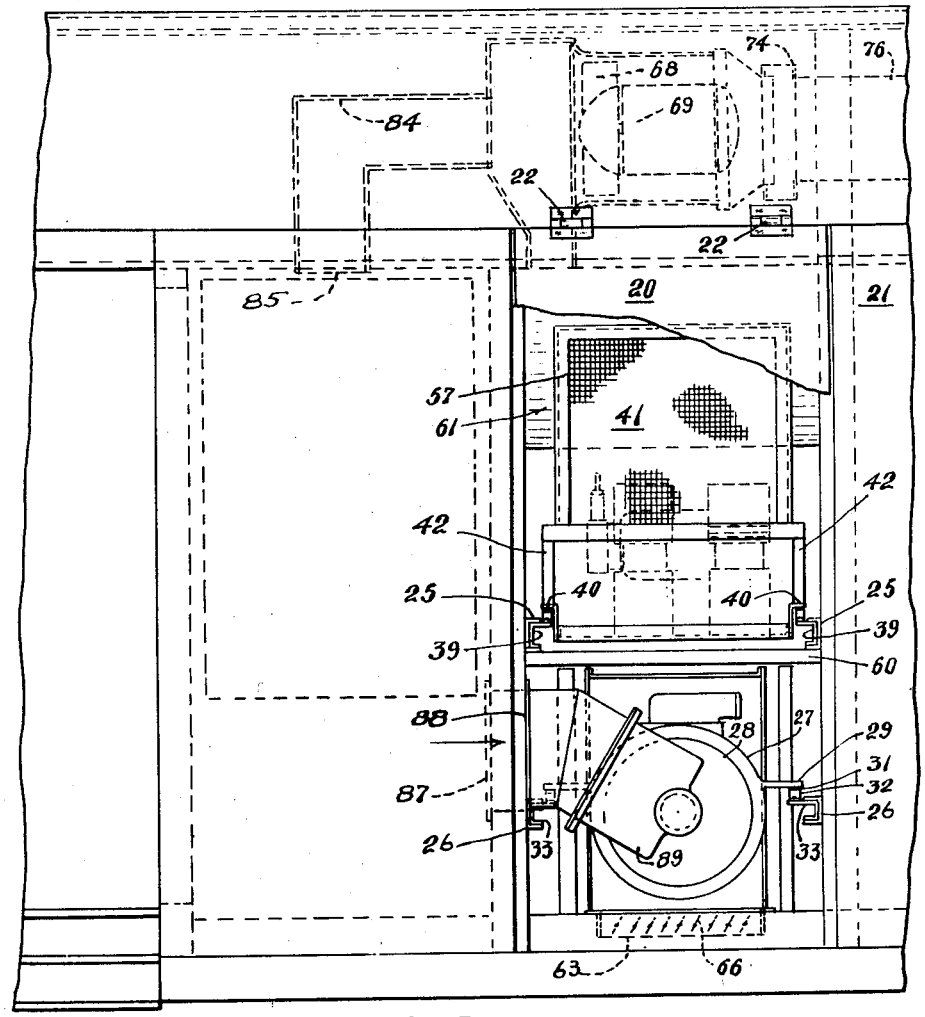
Fig. 3 is a fractional, side elevation of the car with a portion of the apparatus access door removed, and illustrates in end view, the engine-generator unit and the evaporative condenser unit and their slide rail supports.
Figure 4:
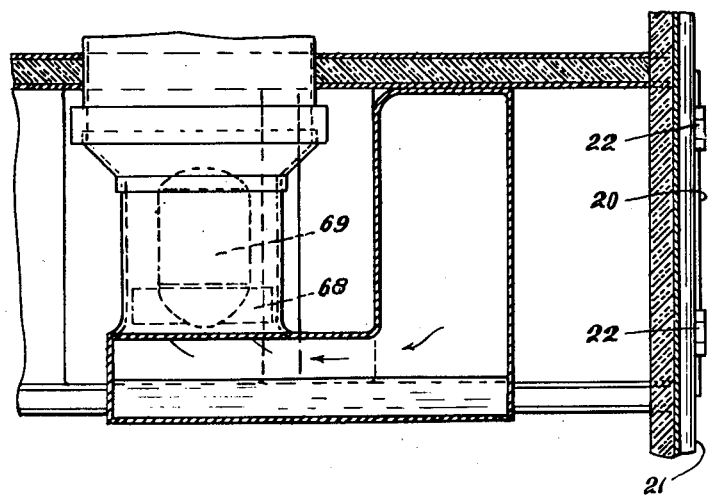
Fig. 4 is a sectional view along the lines 4—4 of Fig. 1.

The small room 80 illustrated by Fig. 2 is a control room having the switchboards 81 therein and on which are mounted the controls to be described in connection with Fig. 10. Some of the recirculated air drawn by the fan 68 through the passage 71 is diverted through the small passage 84 into the opening 85 in the ceiling of the control room. The control room has the opening 87 in one of its walls, which opens into the passage in which the engine 27 and the generator 28 are located, and which is connected with the inlet 88 of a centrifugal fan 89 mounted on the outer end of the rotary shaft of the generator 28. The fan 89 draws the recirculated air through the passage 84 and the control room 80, and blows this air through the generator for cooling its windings and bearings. A portion of the air blown through the generator is diverted through the duct 90 into the fuel and air mixing chamber of the engine 27 where it supplies air for combustion.

The recirculated air supplied into the control room 80 and the generator fan 89, is previously cleaned and cooled air, and preferably is equal in volume to the fresh, make-up air drawn into the outdoor air passage 70. This air is usually blown from the car without use, and by using it as described, the generator is cooled, and warm, clean air for combustion in the engine is provided without using the filters ordinarily provided for cleaning the air supplied to the air intakes of internal combustion engines.

Figure 9:
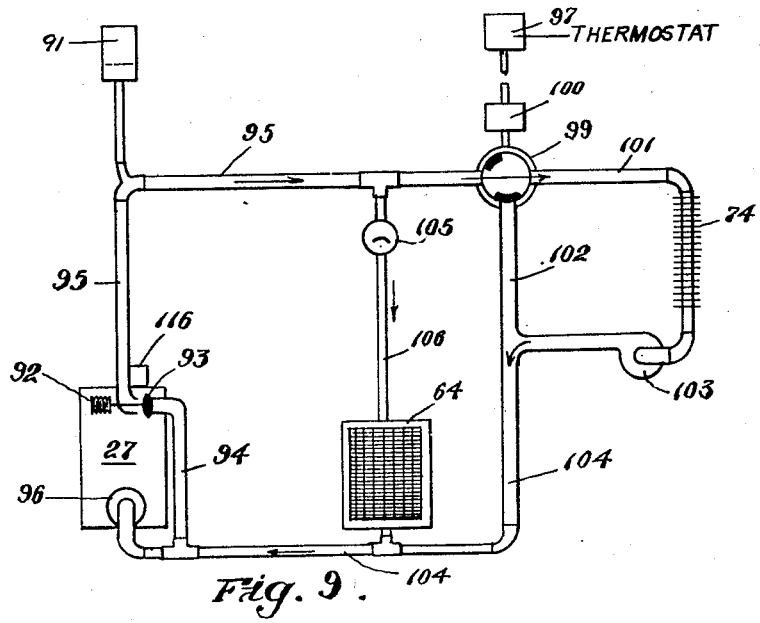
Fig. 9 is a diagrammatic view of the heating system using jacket water from the Diesel engine for heating the passenger space of the car.

Referring now to Fig. 9, the use of the jacket water of the engine 27 for heating the car will be described. The expansion tank 91 keeps the heating piping, and the engine water passages and its radiator filled with water or with a water mixture including a suitable non-freeze solution. The thermostat 92 responsive to heat from the engine, adjusts the valve 93 to close off the supply piping 95, and to open the by-pass pipe 94 whereby the pump 96 of the engine recirculates water through the engine passages and the pipe 94, in a path by-passing the heating coil 74 and the radiator 64, until the jacket water is up to a suitable operating temperature, which may be 180 degrees F. At that temperature, the thermostat 92 opens the inlet to the supply piping 95 and closes the inlet to the by-pass pipe 94.

When the inlet to the by-pass pipe 94 is closed, all of the water from the engine passes through the radiator 64 if the valve 99 is adjusted by the air motor 100 under control of the car thermostat 97 (Fig. 10) to close the pipe 101 to the car heating coil 74, and to close the coil by-pass pipe 102.

When the car thermostat 97 calls for heat, it first admits air to the motor 100 at sufficient pressure to close the by-pass pipe 102 and to open the pipe 101 to the car heating coil 74 whereby the pump 103 can draw hot water through the coil 74 and return it to the engine.

As the car warms up, to prevent overheating, the thermostat 97 causes the motor 100 to adjust the valve 99 to by-pass some of the hot water around the coil 74. When the car thermostat 97 is satisfied, it causes the motor 100 to adjust the valve 99 to close off the pipes 101 and 102 thus routing all of the engine water through the radiator 64. The check valve 105 prevents the passage of the water from the radiator through the pipe 106 into the piping 95.

The operation of the entire control system will now be described with reference to Fig. 10. The air storage tank 110 is adapted to be connected by the pipe 111 to a conventional air compressor, and supplies compressed air through the pipe 112 to the engine fuel tank 113 providing air pressure therein whereby the fuel pump of the engine 27 through not having to pump against a vacuum, can draw fuel from the tank.

Other compressed air from the pipe 112 passes through the piping 114 to the air valve 115 controlled by the thermostat 116, and a portion of this air passes through the piping 117 to the air motor 118 which adjusts the louvres 66 in the air outlet opening 63 (Fig. 1). Another portion of the air from the valve 115 passes through the piping 119 to the air motor 59 which adjusts the louvres 58 in the outdoor air inlet of the evaporative condenser unit 41. The thermostat 116 is located as illustrated by Fig. 9, to respond to the temperature of the water leaving the engine 27.

The evaporative condenser unit also includes the condenser coils 48 and 49, the spray nozzles 54, and the water sump 56 in which the pump 55 for the nozzles 54 is supported. The make-up water tank 120 supplies water through the valve 121 into the sump 56, the valve 121 being controlled by the solenoid 123 as will be described.

Compressed air from the tank 110 also passes through the air relay 126, and a portion of the air from this relay passes into the air motor 127 which advances the throttle of the engine 27 as will be described. Another portion of the air from the relay 126 passes through the air piping 128 into the air relay 129 which controls the electric starting motor 130 of the engine 27. For convenience of illustration, the motor 130 is shown starting the engine through the generator 28 to which it is directly connected. The battery 131 energizes the motor 130 as will be described.

Another portion of the air from the relay 126 passes through the piping 132 into the relay 133 which controls the connection of the electric load to the generator 28 when it gets up to speed, as will be described.

Compressed air from the tank 110 also passes through the piping 135 into the relay 136 which admits air to the air motor 137 which adjusts the louvres 73 in the outdoor air passage 70 when the relay 133 connects the generator 28 to its load. At the same time the motor 69 of the fan 68 which moves the conditioned air, is started, the wiring 134 supplying electric current to the relay 136 and the motor 69 as will be described.

Compressed air from the tank 110 also passes through the piping 135 and 140 to the car cooling thermostat 141 and through same to the air relay 142 which controls starting of the electric motor 43 which drives the refrigerant compressor 35, and to the air relay 143 which controls the starting of the electric motor 48 which drives the refrigerant compressor 36. The hygrostat 145 is connected into the air supply to the relays 142 and 143 and through same also controls the operation of the two refrigerant compressors as will be described.

Other compressed air from the piping 140 passes into the car heating thermostat 97 and through same to the previously described air motor 100 which controls the circulation of the engine jacket water for heating the car, and to the relays 149 and 151. The relay 149 controls the supply of electric current through the wiring 134 to the outdoor air heaters 77 in the passage 70, and the relay 151 controls the supply of electric current to the floor heaters 78.

The thermostats 152 and 153 are located in the outdoor air passage 70, and control through the conventional resistor control box 154, the supply of electric current to the floor heaters 78. Regardless of the action of the thermostat 97 in energizing the floor heaters 78, when the outdoor air temperature is 30 degrees F., dry bulb, the thermostat 152 supplies through resistors in the control box 154, 120 volts to the floor heaters 78. On a drop in the outdoor air temperature to 15 degrees F., the thermostat 153 acts to supply 220 volts to the floor heaters 78. At low temperatures the load of the electric heaters causes rapid warm-up of the engine 27 when same is first started.

In starting up the system, assuming the tank 110 to contain air at the proper operating pressure, it is only necessary to close the electric switch 160. This causes the battery 131 to supply electric current to the motor 130 which starts the engine 27. This also causes the battery 131 to energize the relay 126 causing it to bleed air to the engine throttle motor 127 and the relay 133. The motor 127 starts to advance the throttle of the engine when the pressure of the air in the motor 127 reaches, say 5 pounds per square inch, and continues to advance the throttle slowly until the pressure in the motor 127 reaches 7½ pounds, it requiring about a minute for this advancement of the throttle. This slow advancement of the throttle avoids damage to the engine when cold. At the end of the minute the engine is up to rated speed. The engine may be maintained at a constant speed by a conventional governor.

At the same time the engine gets up to speed, the relay 133 acts to connect the generator 28 to its load supply leads 134. This causes the motor 69 to start the fan 68 of the air conditioning system and causes the relay 136 to energize the motor 137 causing it to open the outdoor louvres 73 in the passage 70.

When the engine starts, current from the generator 28 is supplied to the motor 65 of the fan 62 whereby this fan comes up to speed with the engine, and is in operation simultaneously with the engine.

If the temperature in the passenger space is below, say 70 degrees F. as it is likely to be when the engine is started up in winter, the car thermostat 97 bleeds air to the relays 149 and 151 respectively, and causing same to energize the electric heaters 77 and 78. The load of these heaters causes quick warm-up of the engine. In addition they heat the air entering the car, and the air in the car.

Until the engine jacket water reaches its proper operating temperature which may be 180 degrees F., the thermostat 116 causes the motor 118 to hold the louvres 66 in the outlet 63, and the motor 59 to hold the louvres 58 in the outdoor air passage to the radiator 64, closed. When the jacket water leaving the engine reaches 180 degrees, the motors 59 and 118 will be actuated by the thermostat 116 to open the louvres 58 and 66 respectively.

Assuming winter conditions, the thermostat 92 would cause the valve 93 to close the inlet to the water supply pipe 95, and to open the inlet to the by-pass pipe 94 whereby the pump 96 would recirculate the jacket water through the engine until the temperature of same reaches 180 degrees. At that temperature the thermostat 92 would cause the valve 93 to close the inlet to the by-pass pipe 94, and to open the inlet to the pipe 95. With the thermostat 97 calling for heat, it will cause the motor 100 to adjust the valve 99 to open the inlet to the pipe 101 to the heating coil 74. It will be observed that the passenger space in the car can be heated by the hot water coil 74 and by the electric floor heaters. It is preferred that the floor heaters be cut in only if the heating coil 74 is unable to maintain the desired temperature. Thus the thermostat 97 may act to supply hot water to the coil 74 when the car temperature falls to 70 degrees F. Then if the temperature in the car falls to 68 degrees, the thermostat 97 would act to cut in the floor heaters. At very low outdoor air temperatures, the thermostats 152 and 153 in the outdoor air passage would cause the electric heaters 77 to heat the outdoor air passing through the passage thus acting to load the engine for maintaining its jacket water at the proper temperature in very cold weather, and also aiding in heating the air in the car.

In the cooling season, the car thermostat 141 and the car hygrostat 145 would control the cooling of the air as will now be described. If the temperature in the car were to rise to, say 73 degrees F., the thermostat 141 would bleed air to the relays 142 and 143. When the pressure in the relay 142 reaches say 6 pounds per square inch, it acts to start the motor 43 of the compressor 35 causing it to supply refrigerant to the evaporator coils 46 and 47 (Fig. 8). If the temperature in the car continues to rise to say 75 degrees, the thermostat 141 will continue to bleed air and when the pressure of the air in the relay 143 reaches say 4 pounds, it will act to start the motor 48 of the compressor 36 causing it to supply refrigerant to the evaporator coils 51 and 52.

The hygrostat 145 operates the compressors 35 and 36 to maintain a low relative humidity in the air in the car. If the relative humidity increases to say 55%, the hygrostat will bleed air to the relay 142 as does the thermostat 141, causing it to start the compressor motor 43 of the compressor 35. If the relative humidity is not reduced by the operation of the compressor 35, the relay 143 will be actuated to start the motor 48 of the compressor 36.

At times when the temperature and the relative humidity are both high, the thermostat 141 and the hygrostat 145 will both be acting to operate the compressors.

At other times the temperature of the air may be sufficiently low so that the thermostat 141 will be satisfied, and the hygrostat will cause the air to be cooled to too low a temperature to be supplied into the passenger space, in order for adequate dehumidification to take place. At such times the thermostat 97 will act to cause engine jacket water to be supplied to the coil 74 for reheating the air. Disregarding considerations of comfort this is not wasteful, for the heat absorbed from the coil 74 is heat which otherwise would have to be dissipated by the radiator 64.

During the operation of the compressors, the fan 62 draws outdoor air through the louvres 58, through the spray from the nozzles 54, through the condenser coils 48 and 49, and through the engine radiator 64 thus dissipating the heat from the condenser coils and the radiator. The water sprayed upon the condenser coils causes them to be cooled by evaporative cooling.

When the relay 142 acts to start the compressor 35, it also energizes the solenoid 123 which adjusts the valve 121 to supply water to the sump 56 of the evaporative condenser unit 41, and starts the motor 124 of the pump 55 which supplies water from the sump to the spray nozzles 54.

As a result of the compressor starting relays 142 and 143 operating at different air pressures for starting the compressors 35 and 36, both compressors cannot be started at the same time regardless of the demand for cooling. The compressor 35 will always start first. This results in a greatly reduced starting current as compared to that required by the over-sized, single compressors used in the past, enabling a much smaller power plant to be used.

Upon failure of one of the compressors or its associated components, the other compressor will serve to at least partially cool the car pending repair or replacement of the defective equipment.

Since the evaporator coils of each compressor extend completely across the air stream being cooled, each compressor's evaporators are equally effective in cooling and/or dehumidifying the entire air stream passing through the air conditioning compartment.

What is claimed is:

1. In a passenger vehicle having an air inlet in one of its side walls, means forming a first air passage extending from said inlet transversely of the vehicle, means forming a second air passage connecting with said passage and extending under same transversely of the vehicle, a refrigerant liquefying unit in said first passage, a power unit for supplying power to said refrigeration unit in said second passage, said second passage having an air outlet for exhausting air from the vehicle, and a fan for moving air in through said inlet, through said passages and through said outlet.

2. In a passenger vehicle having an air inlet in one of its side walls, means forming a first air passage extending from said inlet transversely of the vehicle, means forming a second air passage extending under said passage transversely of the vehicle, a refrigerant liquefying unit in said first passage, a power unit for supplying power to said refrigeration unit in said second passage, said second passage having an outlet for exhausting air from the vehicle, means forming a third air passage interconnecting said passages, and a fan in said third passage for moving air in through said inlet, through said passages and through said outlet.

3. In a passenger vehicle having an air inlet in one of its side walls, means forming a first air passage extending from said inlet transversely of the vehicle; means forming a second air passage extending transversely of the vehicle under said first passage; a refrigerant compressor, a motor for driving the compressor, and a condenser for the compressor in said first passage; an electric generator for energizing said motor, a liquid-cooled, internal combustion engine for driving said generator, and a radiator for said engine in said second passage, said second passage having an outlet for exhausting air from the vehicle; a third air passage interconnecting said passages, and a fan in said third passage for moving air in through said inlet, through said passages and through said outlet.

4. In a passenger vehicle having an air inlet in one of its side walls, means forming a first air passage extending from said inlet transversely of the vehicle, means forming a second air passage extending transversely of the vehicle under said first passage, means forming a third air passage interconnecting said passages, an evaporative condenser unit in said first passage adjacent said inlet, a pair of refrigerant compressors and electric motors for driving same in said first passage between said unit and said third passage, said unit containing condensers connected to said compressors, an electric generator for energizing said motors in said second passage, a liquid-cooled internal combustion engine for driving said generator, and a radiator therefor in said second passage, said second passage having an outlet for exhausting air from the vehicle, and a fan in said third passage for moving air through said inlet, said passages and said outlet.

5. The combination as claimed in claim 3 in which dampers are provided in said inlet and said outlet, and means including means responsive to the temperature of the liquid in the radiator adjusts said dampers to closed postions when the temperature of the liquid in the radiator is below a selected temperature.

6. The combination as claimed in claim 4 in which dampers are provided in the inlet and the outlet, and means including means responsive to the temperature of the liquid in the radiator adjusts the dampers to closed positions when the temperature of the liquid in the radiator is below a selected point.

7. An air conditioning system for a passenger vehicle comprising an air chilling unit, a refrigerant compressor for supplying refrigerant to said unit, an electric motor for driving said compressor, an electric generator for energizing said motor, means for supplying air chilled by said unit into the passenger space of said vehicle, and means for circulating air from the passenger space through said generator.

8. The combination as claimed in claim 7 in which an internal combustion engine drives the generator, and means is provided for diverting air circulated through the generator into the air intake of the engine.

9. In a vehicle having a side wall with an opening therein and a displaceable cover for the opening; a pair of spaced structural supports extending from said opening transversely into the vehicle; a refrigerant compressor and an electric motor for driving same, slidably mounted upon said supports, a second pair of spaced structural supports extending from said opening transversely into the vehicle under said supports; and an electric generator for energizing said motor; and an internal combustion engine for driving said generator, slidably mounted upon said second pair of supports.

10. In a vehicle having a side wall with an opening therein and a displaceable cover for the opening, said cover having an air inlet therein, a pair of spaced structural supports extending from said opening transversely into the vehicle, a refrigerant compressor, a condenser therefor and an electric motor for driving the compressor slidably mounted upon said supports, means forming an air passage around said compressor, condenser and motor, said passage having an air inlet in alingnment with and connecting with the air inlet in said cover, a second pair of spaced structural supports under said supports and extending from said opening transversely into the vehicle, an electric generator for energizing said motor, and an internal combustion engine for driving said generator slidably mounted on said second pair of supports, means forming a second air passage around said generator and engine, said second passage having an outlet in the floor of the vehicle, means forming a third air passage interconnecting said passages, and a fan in said third passage for drawing air in through said inlets, moving the air through said passages and discharging it through said outlet.

IRVING S. RITTER.

REFERENCES CITED

The following references are of record in the file of this patent:

UNITED STATES PATENTS

| Number | Name | Date |
|---|---|---|
| 2,185,033 | Melcher | Dec. 26, 1939 |
| 2,185,034 | Melcher | Dec. 26, 1939 |
| 2,187,398 | Goggins | Jan. 16, 1940 |
| 2,302,189 | Chambers et al. | Nov. 17, 1942 |
| 2,320,596 | Henney | June 1, 1943 |